United States Patent [19]
Ohmori

[11] Patent Number: 5,420,886
[45] Date of Patent: May 30, 1995

[54] DIGITAL TRANSMISSION EQUIPMENT

[75] Inventor: Hisakazu Ohmori, Kawasaki, Japan

[73] Assignee: Fujitsu Limited, Kanagawa, Japan

[21] Appl. No.: 56,628

[22] Filed: May 3, 1993

[30] Foreign Application Priority Data

May 11, 1992 [JP] Japan .................................. 4-117760

[51] Int. Cl.$^6$ .............................................. H04B 3/00
[52] U.S. Cl. .................................. 375/258; 375/224; 370/13; 370/15
[58] Field of Search .................. 375/36, 7, 10; 370/13, 370/14, 15

[56] References Cited

U.S. PATENT DOCUMENTS

| | | | |
|---|---|---|---|
| 1,936,947 | 11/1933 | Morgenstern | 375/36 |
| 3,618,128 | 11/1971 | Houcke | 375/36 |
| 4,196,321 | 4/1980 | Bosik | 179/175.2 |
| 4,446,340 | 5/1984 | Fryer | 179/175.3 |
| 4,528,677 | 7/1985 | Ise et al. | 375/36 |
| 4,815,106 | 3/1989 | Propp et al. | 375/36 |
| 4,993,045 | 2/1991 | Alfonso | 375/7 |
| 5,343,461 | 8/1994 | Barton et al. | 370/13 |

OTHER PUBLICATIONS

"T7264 U–Interface 2B1Q Transceiver", AT&T Microelectronics, Jun. 1991.
"LH1465AB ISDN de Termaination IC", AT&T, Nov. 1991.

Primary Examiner—Edward L. Coles, Sr.
Assistant Examiner—Madeleine Nguyen

[57] ABSTRACT

Digital termination equipment for use in signal transmission over a 2-wire subscriber line through an interface transformer includes an impedance unit functionally provided between the 2-wire subscriber line and the interface transformer for generating a high impedance when a current more than a predetermined current value flows therein. A power supply unit is provided having first and second terminals. The first terminal is connected to a winding of the interface transformer for supplying a voltage to the impedance unit through the winding. A current path forming circuit is connected to the impedance unit and to the second terminal of the power supply unit for forming a current path between the impedance unit and the second terminal of the power supply unit when a voltage more than a predetermined voltage value is applied. The power supply unit includes a dc power source and a switch connected in series to the dc power source. The switch is turned on when a local loopback testing is executed.

26 Claims, 7 Drawing Sheets a b c d a b c d

LOCAL LOOPBACK TESTING SIGNAL

LOCAL LOOPBACK TESTING SIGNAL

LOCAL LOOPBACK
TESTING SIGNAL

LOCAL LOOPBACK
TESTING SIGNAL

DIGITAL TRANSMISSION EQUIPMENT

BACKGROUND OF THE INVENTION

1. Field of the Invention

This invention relates to digital transmission equipment and more particularly to digital transmission equipment connected to a 2-wire subscriber line and having a local loopback testing function.

2. Description of the Related Art

According to high speed and digitalization in transmission network systems, digital equipment that sends and receives digital signals has been more popularly installed not only in main routes of the system but also at subscribers.

This situation has required testing methods for finding out failure positions in the system to receive transmitted signals with fewer faults.

A local loopback testing is one of the testing methods. FIGS. 1(A) and 1(B) illustrate a general concept of the local loopback testing in a digital transmission system. In FIGS. 1(A) and 1(B), the reference numeral 1 is network termination equipment (NTE). The reference numeral 2 is exchange or switch equipment (EX). The reference numeral 3 is subscriber equipment or terminal equipment (TE), and the reference numeral 21 is line termination equipment (LTE) that is provided in the exchange equipment 2.

The line termination equipment 1 and the network termination equipment 21 are also referred as digital termination equipment, because they have the same function as explained later.

The reference numeral 4 is a 2-wire subscriber line. For example, digital signals of a 4-level pulse amplitude are transmitted over the 2-wire subscriber line between the exchange equipment 2 and the network termination equipment 1. The digital signals of a 4-level pulse amplitude are defined as 2B1Q code signals by the T1, 601 ANSI North American 1991 Standard. The numeral 5 is two 2-wire lines, which connect the network termination equipment 1 and the terminal equipment 3.

In FIG. 1(A), a loopback testing is executed to confirm the operation of the network termination equipment 1, and FIG. 1(B) explains a loopback testing for the line termination equipment 21. Sending signals are loop-backed in the digital termination equipment 1 and 21 as shown respectively in FIG. 1(A) and FIG. 1(B), when the loopback testing is executed. The defect or failure of operations in the equipment 1 and 21 is checked by detecting the loop-backed signals.

The local loopback testing will be explained in more detail referring to FIGS. 2(A) through 2(D). Although FIG. 2(A) illustrates a part of the structure of the network termination equipment 1, the line termination equipment 21 has the same structure and function as those of the network termination equipment 1.

The part of the structure of the network termination equipment 1 is composed of a sending circuit 101, an interface transformer 14, a receiving circuit 102 and an echo canceler circuit 103. A pair of terminals T and R are connected to the 2-wire subscriber line 4.

In a transmission mode, the sending circuit 101 groups sending digital signals (a) into pairs of bits and codes the pairs of bits to digital signals (a') of a 4-level pulse amplitude. The coded digital signals are sent out to the 2-wire subscriber line 4 through the interface transformer 14.

On the other hand, the receiving circuit 102 receives through the interface transformer 14 digital signals (b) of a 4-level pulse amplitude sent from the line termination equipment 21 that is provided in the exchange equipment 2. The digital signals received by the receiving circuit 102 are decoded into digital signals (c) and the decoded digital signals are then sent to the echo canceler 103.

The echo canceler 103 subtracts an echo-backed portion (a) of the sending digital signals from the digital signals received and decoded by the receiving circuit 102.

The digital signal trains illustrated in the references (a) through (d) of FIG. 2(B) show signals at the corresponding positions (a) through (d) of the network termination equipment 1. In FIG. 2(B), the pulse train of digits such as (0, 1, 0, 1, 0, 1, 1, 0) with the reference (a) is the output of the sending circuit 101.

The pulse train of digits (0, 1, 1, 0, 0, 1, 1, 0) at the reference (b) corresponds to digital signals transmitted from the line termination equipment 21 and appears at the position (b) in FIG. 2(A). The signals at the reference (b) should be illustrated as digital signals of a 4-level pulse amplitude as explained above, but they are illustrated in the form of decoded digital signals to simplify the illustration of FIG. 2(B).

The reference (c) shows the pulse train of digits (0, 2, 1, 1, 0, 2, 2, 0), which is composed of the signals transmitted from the line termination equipment 21 at the reference (b) and a portion, of the sending signals, echo-backed through the interface transformer 14 at the reference (a).

The reference (d) shows the pulse train at the output of the echo canceler 103, which is the same as that of the references (b), because the pulse train of the reference (a) is subtracted by the echo canceler 103 from the pulse train of the reference (c).

As explained above, the role of the echo canceler 103 is to eliminate an echo-backed portion of the sending digital signals from digital signals received from the line termination equipment 21. Then, digital signals may be received at the network termination equipment 1 without error or with less error rate.

FIGS. 2(C) and 2(D) show examples of signals at the corresponding positions (a) through (d) of the network termination equipment 1 on loopback testing modes. FIG. 2(C) shows the pulse trains of the digital signals, where the digital signals of a 4-level pulse amplitude transmitted through the 2-wire subscriber line 4 are blocked off at the position (b), and the echo canceler 103 is turned off. Therefore, the output digital signals from the echo canceler 103 are the same as the sending digital signals at the position (a), if the circuit blocks shown in FIG. 2(A) are in a normal operation or right condition.

FIG. 2(D) shows the pulse trains, where digital signals transmitted through the 2-wire subscriber line 4 are blocked off at the position (b) and the operation of the echo canceler 103 is still active.

In this case, the echo canceler 103 subtracts sending digital signals from the echo-backed signals and therefore, the output of the echo canceler 103 becomes all "0" signals as shown in the reference (d) of FIG. 2(D) if the circuit blocks of FIG. 2(A) are in normal state. Thus, it can be determined whether the operation of the circuits shown in FIG. 2(A) is in normal state or not, considering the output from the echo canceler 103.

From the foregoing explanation, it should be understood that the blocking off or disconnection at the position (b) between the interface transformer 14 and the 2-wire subscriber line 4 is necessary when a local loopback testing is executed.

FIG. 3 illustrates a conventional structure of the network termination equipment 1. In FIG. 3, the reference numeral 10 is an interface transceiver 10, in which there are provided the sending circuit 101, the receiving circuit 102 and the echo canceler 103 such as explained concerning FIG. 2(A).

The interface transceiver 10 may be constructed in an IC chip. The IC chip as coded T7264, a product of AT&T can be used for the interface transceiver 10. The reference numeral 11 is an interface transformer comprising two transformers T1 and T2.

The first windings of the transformers T1 and T2 are connected to the terminal equipment 3 through a pair of 2-wire subscriber lines 5 (shown in FIGS. 1(A) and 1(B) and the second windings are connected to a line termination block 12.

The line termination block 12 has the role of supplying a test pattern signal generated in a test pattern generator 121 to the interface transceiver 10 at the local loopback testing. The line termination block 12 also extracts a loop-backed test pattern signal and sends it to a test pattern detection circuit 122.

The test pattern detection circuit 122 detects whether the loop-backed test pattern signal is the same as that generated in the test pattern generator 121 or not. Then, the test pattern detection circuit 122 concludes if the function of the circuits through which the test pattern signal flows is in normal state or not.

The reference numeral 13 is a 2/4-wire converter that converts 4-wire mode signals supplied from the line termination block 12 to 2-wire mode signals and in reverse 2-wire mode signals supplied from the interface transceiver 10 to 4-wire mode signals.

The 2/4-wire converter 13 also includes a loopback instruction detector 110. The detector 110 is to detect, for example, a predetermined code pattern signal sent from the terminal equipment 3 or a switch information given by a manually operable switch which is provided in the network terminal equipment 1, but is not shown in the drawing.

The reference numeral 14 is an interface transformer, which transfers signals between the interface transceiver 10 and a 2-wire subscriber line 4 (shown in FIGS. 1(A) and 1(B), isolating dc currents.

The reference numeral 15 is a loopback relay block comprising a pair of mechanical relays RL1 and RL2 positioned on signal transmission paths as shown in FIG. 3.

The mechanical relays RL1 and RL2 are driven by the loopback testing instruction signal generated in the loopback instruction detector 110 to make the signal transmission paths open. This prevents digital signals of a 4-level pulse amplitude from flowing to the 2-wire subscriber line 4 and in reverse to the network termination equipment 1 at the local loopback testing.

However, the conventional structure as illustrated in FIG. 3 employs mechanical relays RL1 and RL2. Therefore, there has been the possibility such that digital signals of a 4-level pulse amplitude cannot flow between the network termination equipment 1 and the 2-wire subscriber line 4 in a normal signal transmission mode. The possibility is caused by the disconnection of contacts of the mechanical relays RL1 and RL2.

Such the disconnection may occur due to physical noises or vibrations given from outside the equipment. Consequently, the reliability of digital signal transmission should be diminished in a conventional transmission system.

To avoid such problems as existing in the conventional equipment, there has been proposed alternative ways. In one of the alternative ways, an operator physically disconnects the 2-wire subscriber line 4 from the network termination equipment 1 at the loopback testing in stead of providing mechanical relays on signal transmission paths.

However, such a physical disconnection has not been practical and cumbersome for the operator. Therefore, as second alternative way, a loopback point is provided at digital circuits in the digital terminal equipment 1 for a local loopback testing, if even such the physical disconnection is not possible.

But in such the case, portions external to the digital circuits of the equipment are not subject to a local loopback testing.

Therefore, such the testing by providing a loopback point at the digital circuits cannot accord with the purpose of the local loopback testing to detect any failure portion in a digital network system and to disconnect the failure portion from the system.

SUMMARY OF THE INVENTION

Accordingly, it is an object of the present invention to provide a novel structure of digital termination equipment, in which there is no necessary to have any mechanical contact on signal transmission paths and physically disconnect a 2-wire subscriber line from the digital termination equipment when a local loopback testing is executed.

It is another object of the present invention to provide digital termination equipment in which there is provided a high impedance on signal transmission paths to block off the flow of digital signals of a 4-level pulse amplitude between an interface transformer and a 2-wire subscriber line when a loopback testing is executed.

It is further object of the present invention to provide digital termination equipment having high impedance generating elements provided on signal transmission paths, the impedance of which is controlled by a loopback instruction signal.

It is yet another object of the present invention to provide digital termination equipment, which is for use in signal transmission over a 2-wire subscriber line through an interface transformer and which comprises an impedance means functionally provided between the 2-wire subscriber line and the interface transformer for generating a high impedance when a current more than a predetermined current value flows therein; a power supply means having first and second terminals, the first terminal being connected to a winding of the interface transformer for supplying a voltage to said impedance means through the winding; and a current path forming means connected to the impedance means and to the second terminal of the power supply means for forming a current path between the impedance means and the second terminal of the power supply means when a voltage more than a predetermined voltage value is applied.

Other objects and advantages of the present invention will become apparent from the detailed description to follow taken in conjunction with the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
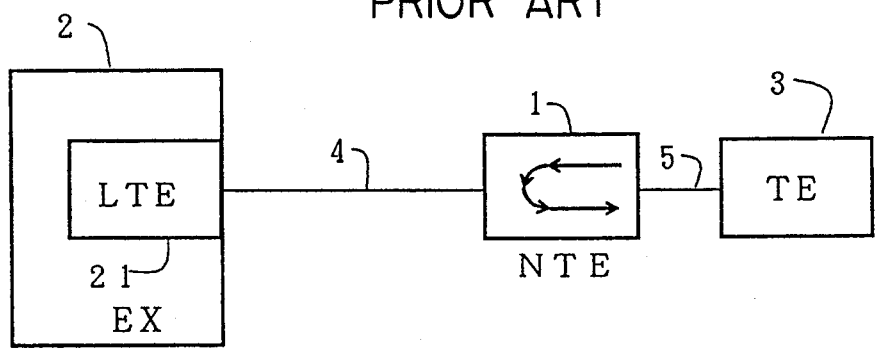
FIGS. 1(A) and 1(B) are schematic block diagrams of digital transmission systems, explaining general concepts of a local loopback testing in digital terminal equipment and line termination equipment, respectively.
Figure 1:
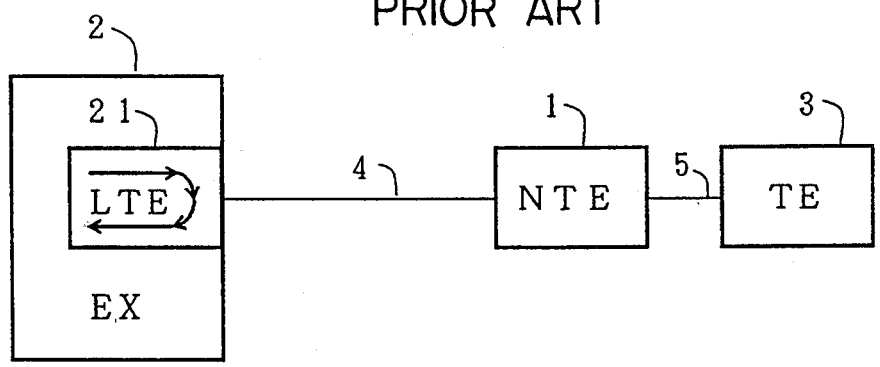
Figure 2A:
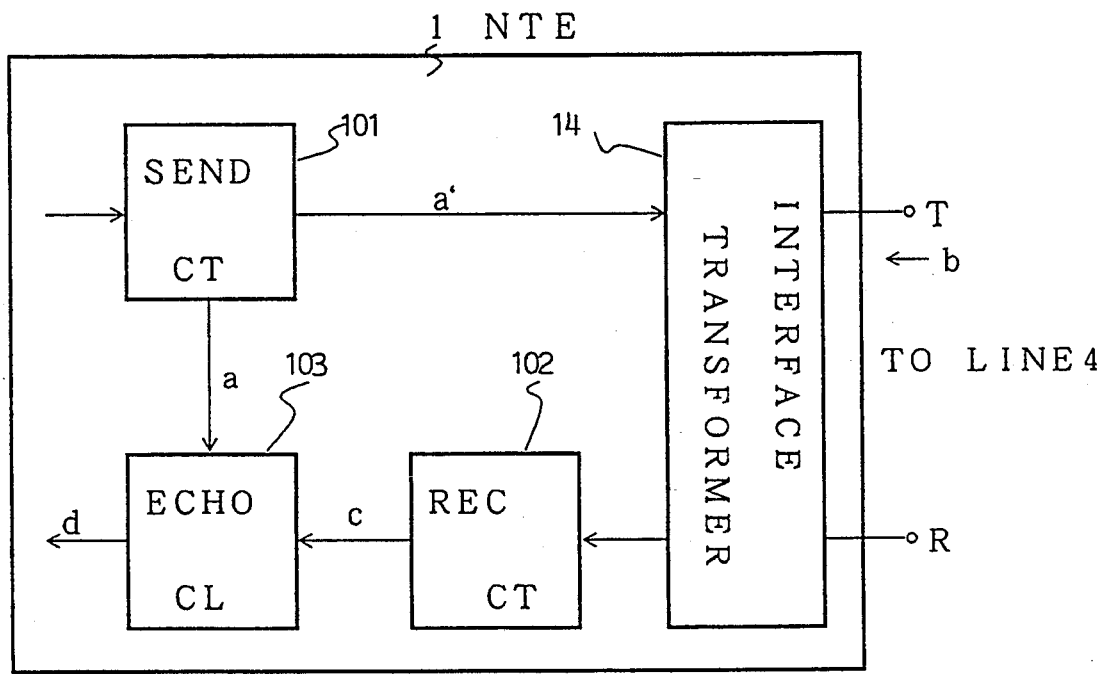
FIG. 2(A) is a schematic block diagram of a portion in the digital termination equipment illustrated in FIG. 1(A).
Figure 2B:
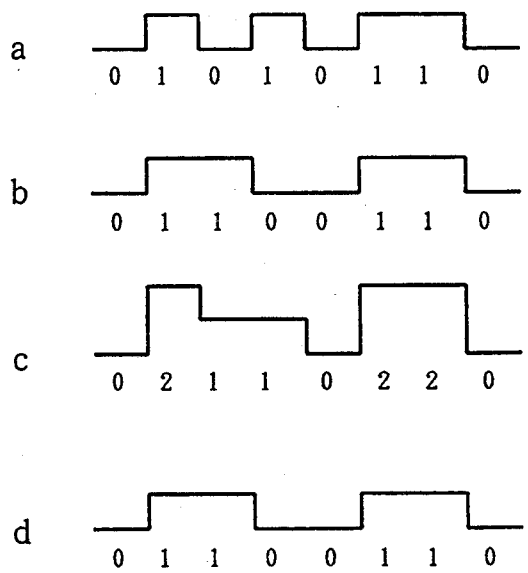
FIG. 2(B) shows pulse trains of digital signals at corresponding positions of the digital termination equipment illustrated in FIG. 2(A), explaining the cancellation of an echo-backed portion of sending digital signals at the echo canceler illustrated in FIG. 2(A) in a normal transmission mode.
Figure 2C:
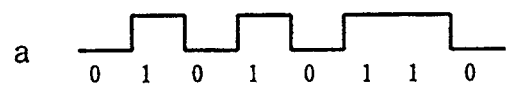
FIGS. 2(C) and 2(D) are pulse trains of digital signals at corresponding positions of the digital termination equipment illustrated in FIG. 2(A), explaining the cancellation of an echo-backed portion of sending digital signals at the echo canceler illustrated in FIG. 2(A) in loop-back testing modes.
Figure 2C:
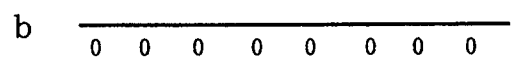
Figure 2C:
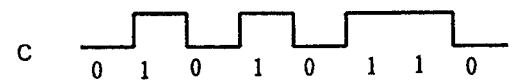
Figure 2C:
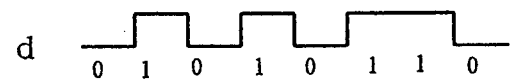
Figure 2D:
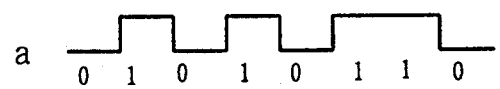
Figure 2D:
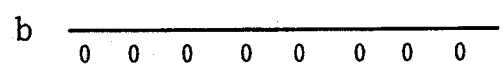
Figure 2D:
Figure 2D:
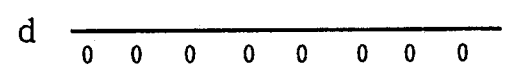
Figure 3:
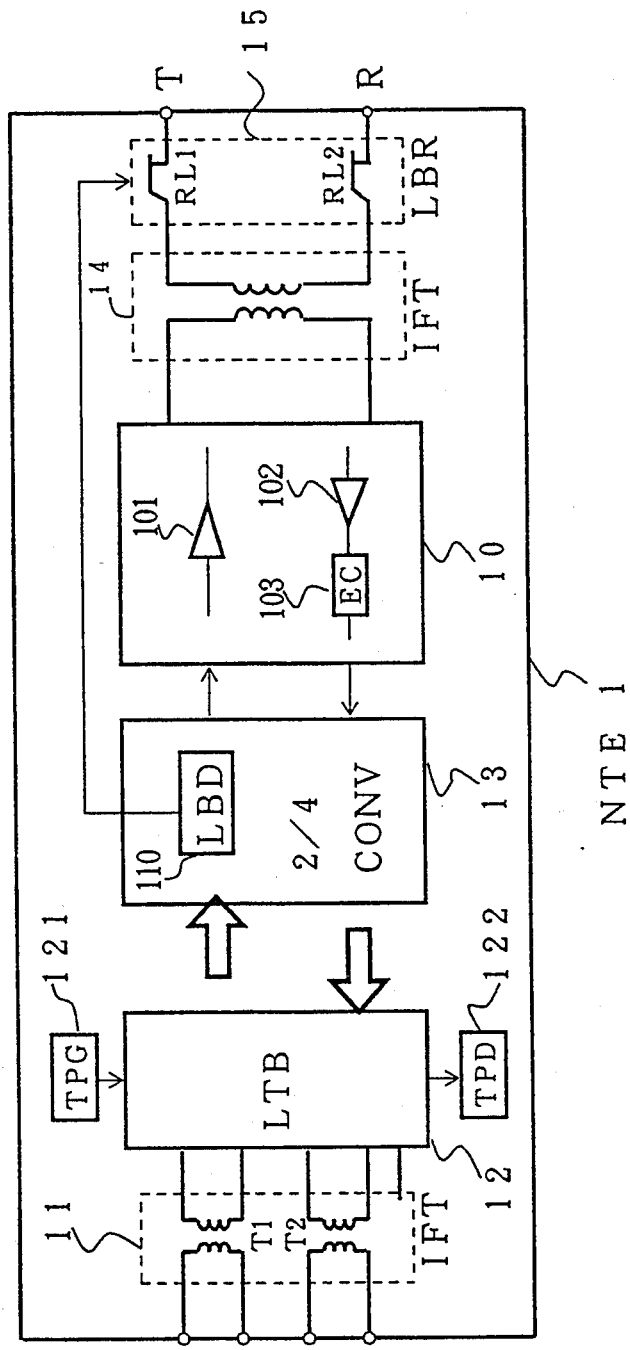
FIG. 3 is a schematic block diagram of conventional network termination equipment.
Figure 4:
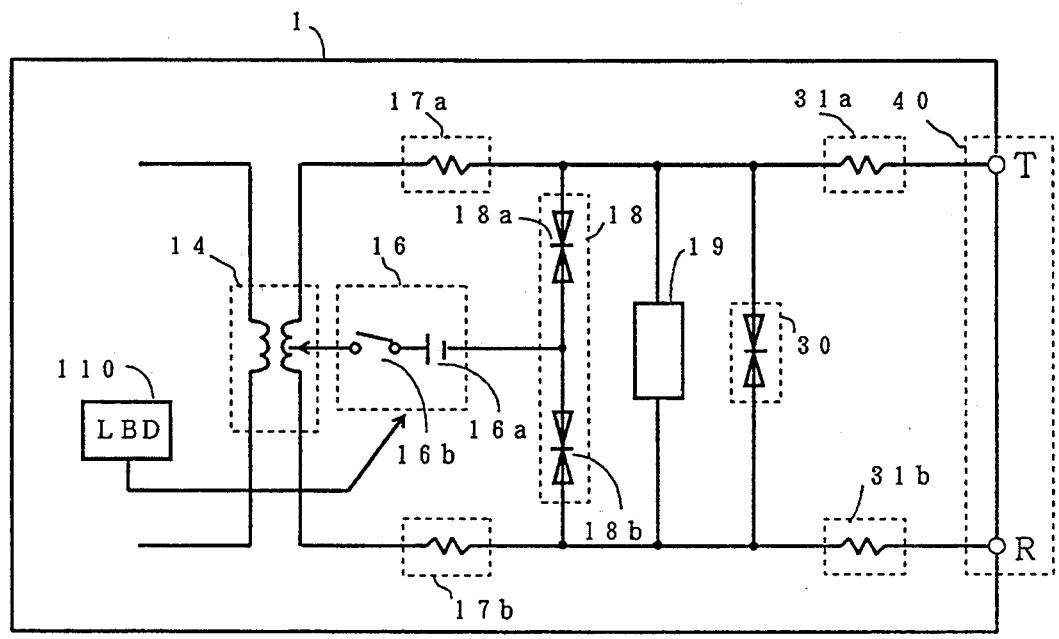
FIG. 4 is a circuit diagram of a portion in digital termination equipment embodying the present invention.

FIG. 4 illustrates a circuit diagram of a portion in digital termination equipment embodying the present invention. The portion illustrated in FIG. 4 fundamentally corresponds to the interface transformer 14 and the loopback relay block 15 illustrated in FIG. 3.

The rest of the circuit blocks of FIG. 3 such as the interface transceiver 10 and so forth is omitted from FIG. 4 because they may also be employed in the embodiment of the present invention.

It is the feature of the present invention that high impedance generating elements have taken as explained hereinafter the place of the mechanical relays RL1 and RL2 of the loopback relay block 15 in the conventional network termination equipment such as illustrated in FIG. 3.

In FIG. 4, the reference numerals 17a, 17b are a pair of high impedance generating elements. The reference numerals 31a, 31b are a pair of fusible resistors. The high impedance generating elements 17a, 17b and the fusible resistors 31a, 31b are provided in series on signal transmission paths.

The signal transmission paths are formed between the interface transformer 14 and a pair of the terminals T and R, which is to be connected to a 2-wire subscriber line 4.

The high impedance generating elements 17a, 17b indicate such an impedance characteristic that the impedance of the elements 17a, 17b becomes large enough to block off the transmission of signals through the signal transmission paths when an electric current having more than a certain value flows therein. The fusible resistors 31a and 31b are fused when an external current, e.g. lightning surge current or AC exposure current, more than a certain value flows therein.

In an embodiment of the present invention, POSISTOR is used as the high impedance generating elements 17a, 17b. POSISTOR is the trade mark of a product of MURATA SEISAKUBYO, a Japanese manufacturer.

According to a data sheet of POSISTOR supplied by the company, the electrical characteristics of the device are as follow;

| | |
|---|---|
| Resistance value | 8.2 Ω ± 20% |
| Maximum Voltage | AC 56 Vrms @ at 25° C. |
| Maximum Current | 0.8 A |
| No-operation Current | 130 mA @ at 60° C. |
| Operation Current | more than 320 mA @ at −10° C. |

The impedance value of the device, POSISTOR increases when a current more than the operation current is applied, and it is also known that the impedance value of the device becomes more than 1,000 times at a certain condition of an applied current and temperature of the device.

The reference numeral 18 in FIG. 4 is a current path forming element composed of sub-elements 18a, 18b, which are connected in series. The current path forming element 18 is provided between first terminals of the high impedance generating elements 17a, 17b, the second terminals of which are connected to the interface transformer 14.

The current path forming elements 18 has a characteristic such that the impedance of the element is high when an applied voltage is less than a first voltage value and in contrarily is low enough to make a short circuit between the both terminals of the element when an applied voltage is more than a second voltage value.

In an embodiment of the present invention, a varistor is used as a current path forming element 18, and more specifically, a varistor coded as ENC180D-10B, a product of FUJI ELECTRIC, a Japanese manufacturer is employed in an embodiment of the present invention.

According to a test data obtained by the present applicant, the varistor coded as ENC180D-10B indicates a high impedance enough to make open between the both terminals of the varistor when a first voltage less than 16 V as the first voltage is applied, but indicates low impedance enough to make short between the terminals of the varistor when a voltage more than 20 V as the second voltage value is applied.

The reference numeral 16 is a dc power supply composed of a dc source 16a and a switch 16b. The dc power supply 16 is provided between the center tap of the interface transformer 14 and the connection point of the sub-elements 18a, 18b of the current path forming element 18. The switch 16b of the dc power supply 16 is turned on by a local loopback testing signal generated in the loopback instruction detector 110 as explained concerning FIG. 3.

The switch 16b may be formed by any suitable way and in an embodiment of the present invention an opto-isolator or photo coupler is used to isolate a dc connection between the both windings of the interface transformer 14 and to avoid the presence of any mechanical element.

The reference numeral 30 is a surge absorber that is the same type as the element 18 and is used to protect the equipment from a momentary surge which is applied from the outside due to for example thunder.

The reference numeral 19 is a dc termination circuit and in an embodiment of the present invention an IC as coded LH1465AB of a product of AT&T is used which plays as an electronic inductor for a dc termination with high impedance. The characteristics of the IC conform to the ANSI North American Standard T1. 601-1988.

Figure 5:
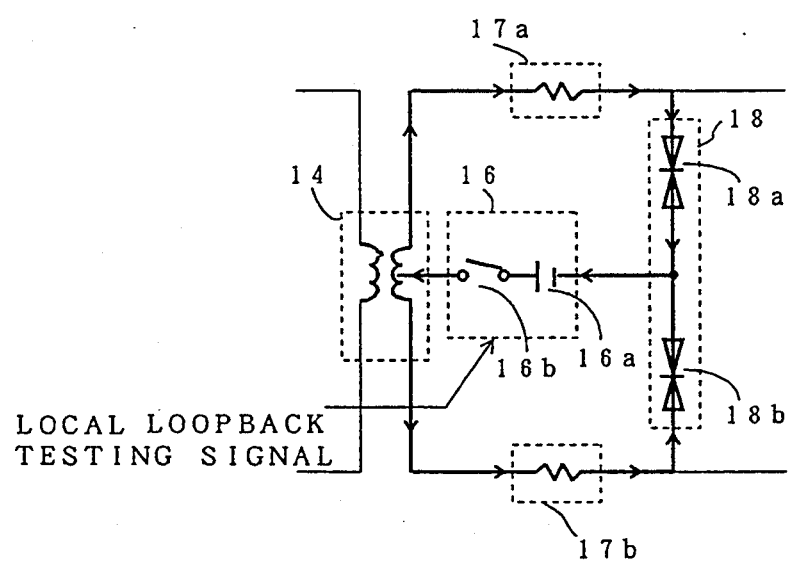
FIG. 5 is a circuit diagram of a first arrangement for supplying a dc power to high impedance generating elements shown in FIG. 4.

FIG. 5 is a first arrangement for supplying a dc power to the high impedance generating elements 17a, 17b embodying the present invention.

First and second current paths are formed as follows and currents flow through the current paths when the switch 16b is turned on by the local loopback testing signal.

The first current path is formed by a series connection of the dc power supply 16, the high impedance generating element 17a and the sub-element 18a. The second current path is formed in the same way as the first current path by a series connection of the dc power supply 16, the high impedance generating element 17b and the sub-element 18b.

A momentary current of 3.4 amperes calculated by the following equation flows in the first and second current paths respectively where POSISTOR is used for the high impedance generating element 17a, 17b and a varistor is used for the current path forming elements 18a, 18b.

$$(48-20)+8.2=3.4 \text{ (A)}$$

wherein 48 is the voltage value of the dc power source 16a, 20 is the voltage value by which the impedance of the current path forming sub-elements 18a, 18b becomes low enough to be of short, and 8.2 is the resistance value of POSISTOR.

After the momentary current flows, the impedance of the high impedance generating elements 17a, 17b of POSISTOR becomes high to decrease a current flowing in the first and second current paths. The impedance of POSISTOR at the time becomes more than 80 K$\Omega$.

This phenomenon forms the same condition as that the signal transmission path between the interface transformer 14 and the 2-wire subscriber line 4 is made open by a mechanical switch such as a relay circuit.

Figure 6:
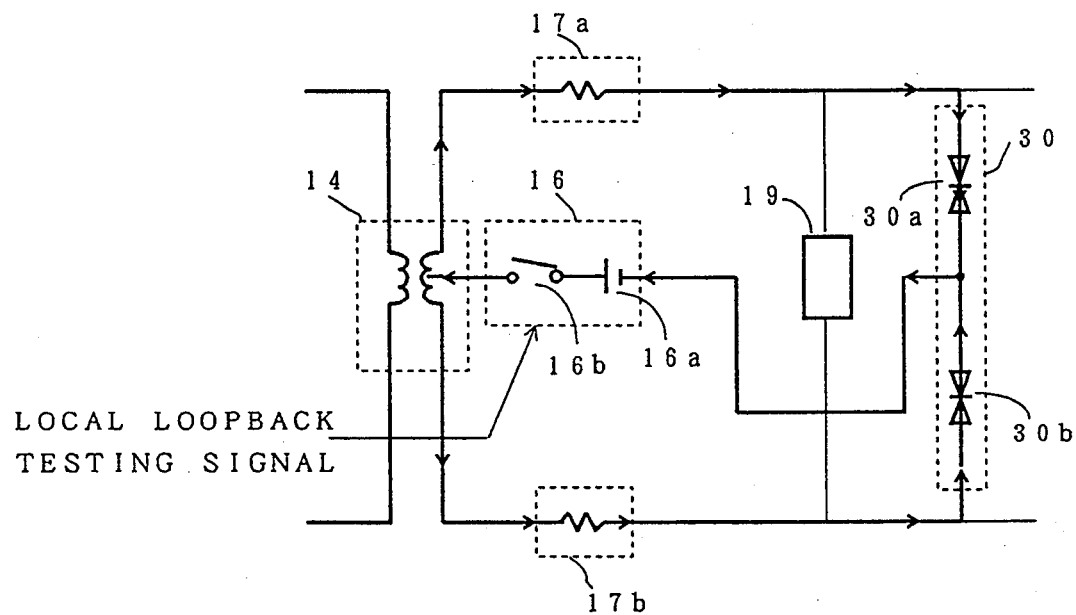
FIG. 6 is a circuit diagram of a second arrangement for supplying a dc power to high impedance generating elements shown in FIG. 4.

FIG. 6 is a second arrangement for supplying a dc power to the high impedance generating elements 17a, 17b embodying the present invention.

The arrangement of FIG. 6 uses a surge absorber 30 in stead of the current path forming element 18. The surge absorber 30 is originally provided to absorb an abnormal surge voltage given from the outside of the equipment due to for example, thunder as explained above. For the surge absorber 30, a same element as the current path forming element may be employed. Therefore, the current path forming element 18 may be omitted.

In FIG. 6, the surge absorber 30 comprises a pair of surge absorber elements 30a, 30b connected in series, and the connection point of the elements 30a, 30b is connected with a terminal of the dc power source 16a.

The surge absorber elements 30a, 30b also play as current path forming elements when the switch 16b is turned on according to a local loopback testing signal supplied from the loopback testing instruction detection circuit 110.

Figure 7:
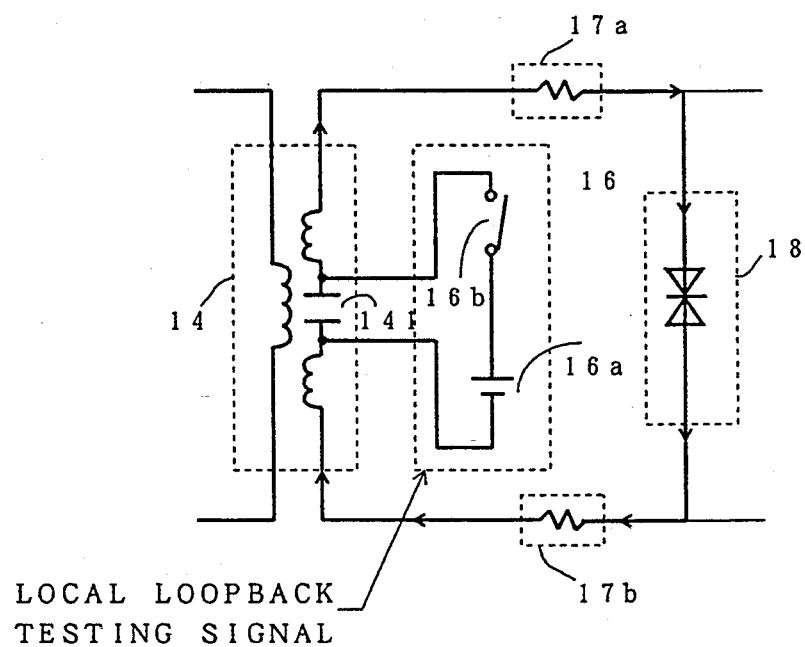
FIG. 7 is a circuit diagram of a third arrangement for supplying a dc power to high impedance generating elements shown in FIG. 4.

FIG. 7 illustrates a third arrangement for supplying a dc power to the high impedance generating elements 17a, 17b embodying the present invention.

The arrangement of FIG. 7 features in that a capacitor 141 is provided at the center tap of a winding of the interface transformer 14. The dc power supply 16 applies a dc voltage to both the terminals of the capacitor 141.

According to the arrangement in FIG. 7, a current path is formed by the series connection of the dc power supply 16, the high impedance generating element 17a, the surge absorber 18 and the high impedance generating element 17b at the local loopback testing.

As calculated in the same way as explained concerning the arrangement of FIG. 5, a momentary current flowing in the high impedance generating elements 17a, 17b is 1.7 amperes, which is large enough to increase the impedance of the high impedance generating elements 17a, 17b.

Therefore, the signal transmission path between the interface transformer 14 and a pair of terminals T and R becomes open, as the impedance of the high impedance generating elements 17a, 17b increases.

Figure 8:
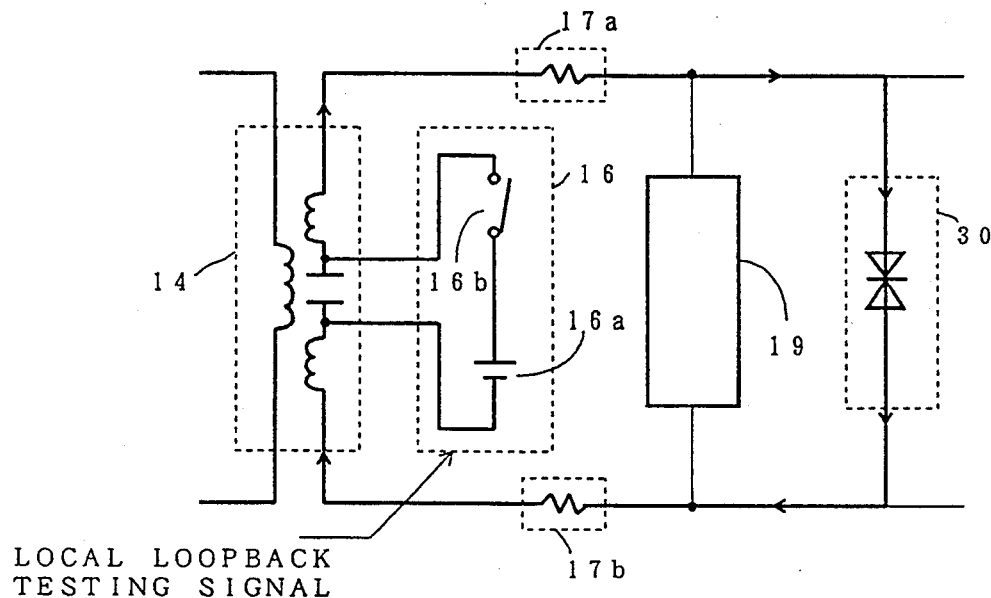
FIG. 8 is a circuit diagram of a fourth arrangement for supplying a dc power to high impedance generating elements shown in FIG. 4.

FIG. 8 illustrates a forth arrangement for supplying a dc voltage to the high impedance generating elements 17a, 17b embodying the present invention.

The arrangement of FIG. 8 features that the surge absorber 30 is also employed for forming a current path in stead of the current path forming element 18, and therefore, in the arrangement of FIG. 7, the current path forming element 8 as explained in FIG. 6 is omitted. The operation of the arrangement at the loopback testing is the same as that of the arrangement of FIG. 6.

Figure 9:
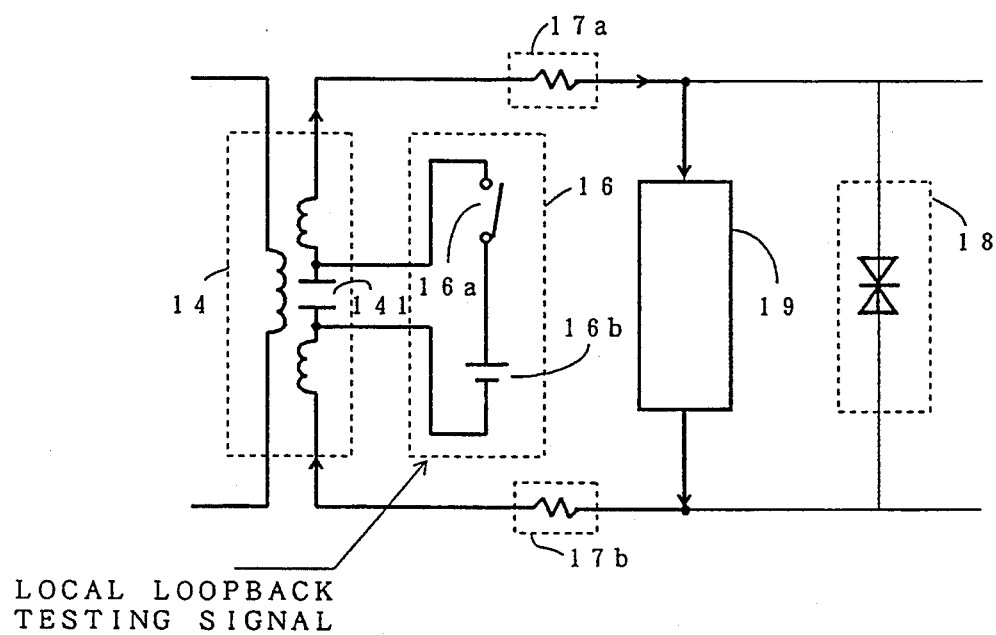
FIG. 9 is a circuit diagram of a fifth arrangement for supplying a dc power to high impedance generating elements shown in FIG. 4.

FIG. 9 illustrates a fifth arrangement for supplying a dc voltage to the high impedance generation elements 17a, 17b embodying the present invention.

The arrangement of FIG. 9 features that the dc termination circuit 19 is also used as a current path forming element.

For the dc termination circuit 19, the IC device as coded LH1465AB of a product of AT&T is employed as explained referring to FIG. 4. According to the electrical characteristics of the device, it conducts current with 35 V or more applied thereto, then turns on and goes into ON state. However, it may not conduct current, when applied with 20 V or less.

Therefore, the IC device can be also used as a current path forming element to realize the same operation and function as explained with reference to the previous arrangements embodying the present invention.

As explained above, the digital termination equipment embodying the present invention drives the switch 16b of the dc power supply 16 when a local loopback testing signal is generated.

Then the dc power 16 supplies an operation current to the high impedance generating elements 17a, 17b via the current path forming element 18, the surge absorber 30 or the dc termination circuit, so that the impedance of the high impedance generating elements 17a, 17b increases to block off signals transmitted from the line termination equipment 21 and at the same time to prevent sending digital signals from flowing over the 2-wire subscriber line 4.

Consequently, the present invention makes it possible that an operator needs not to physically disconnect the 2-wire subscriber line 4 from the equipment at the loop-back testing any longer.

In addition, no mechanical relays on signal transmission paths are necessary and therefore, the reliability of signal transmission can be maintained.

The invention may be embodied in other specific forms without departing from the spirit or essential characteristics thereof.

The present embodiment is therefore to be considered in all respects as illustrative and not restrictive, the scope of the invention being indicated by the appended claims rather than by the foregoing description and all changes, which come within the meaning and range of equivalency of the claims are therefore intended to be embraced therein.

What is claimed is:

1. Digital termination equipment for use in signal transmission over a 2-wire subscriber line through an interface transformer, comprising:
    an impedance means functionally provided between the 2-wire subscriber line and the interface transformer for generating a high impedance which is large enough to block off the transmission of signals over said subscriber line when a current more than a predetermined current value flows in said impedance means;
    a power supply means having first and second terminals, the first terminal being connected to a winding of the interface transformer for supplying a voltage to said impedance means through the winding during a local loopback testing; and
    a current path forming means connected to the impedance means and to the second terminal of the power supply means for forming a current path between the impedance means and the second terminal of the power supply means when a voltage more than a predetermined voltage value is applied.

2. Digital termination equipment according to claim 1,
    wherein said power supply means includes a dc power source and a switch means connected in series to the dc power source, said switch means being turned on when a local loopback testing is executed.

3. Digital termination equipment according to claim 2, wherein said switch means comprises a photo coupler.

4. Digital termination equipment according to claim 2,
    wherein said dc power source has a voltage more than the predetermined voltage value.

5. Digital termination equipment according to claim 1,
    wherein said impedance means is formed by POSISTOR.

6. Digital termination equipment according to claim 1,
    wherein said current path forming means is formed by a varistor.

7. Digital termination equipment according to claim 1,
    wherein digital signals of a 4-level pulse amplitude, which are defined as 2B1Q signals are transmitted over the 2-wire subscriber line.

8. Digital termination equipment for use in signal transmission over a 2-wire subscriber line through an interface transformer including a winding which has first and second terminals and a center tap, comprising:
    a first impedance means functionally provided between the first terminal of the interface transformer and a first terminal of the 2-wire subscriber line for generating a high impedance which is large enough to block off the transmission of signals to said first terminal of the subscriber line when a current more than a predetermined value flows in said first impedance means;
    a second impedance means functionally provided between the second terminal of the interface transformer and a second terminal of the 2-wire subscriber line for generating a high impedance which is large enough to block transmission of signals to said second terminal of the subscriber line when a current more than a predetermined value flows in said second impedance means;
    a power supply means having first and second terminals, the first terminal being connected to the center tap of the winding of the interface transformer for supplying a voltage to said first and second impedance means through the winding during a local loopback testing;
    a first current path forming means connected to said first impedance means and to the second terminal of the power supply means for forming a current path between the first impedance means and the second terminal of the power supply means when a voltage more than a predetermined value is applied; and
    a second current path forming means connected to said second impedance means and to the second terminal of the power supply means for forming a current path between the second impedance means and the second terminal of the power supply means when a voltage more than a predetermined value is applied.

9. Digital termination equipment according to claim 8,
    wherein said power supply means includes a dc power source and a switch means connected in series to the dc power source, said switch means being turned on when a local loopback testing is executed.

10. Digital termination equipment according to claim 9, wherein said switch means comprises a photo coupler.

11. Digital termination equipment according to claim 9, wherein said dc power source has a voltage more than the predetermined voltage value.

12. Digital termination equipment according to claim 9, further comprising:
    a surge absorber connected between the both terminals of the 2-wire signal transmission line, which indicates a low impedance when a surge voltage is applied thereto.

13. Digital termination equipment according to claim 12,
    wherein said current path forming means is formed by the surge absorber.

14. Digital termination equipment according to claim 8, wherein said impedance means is formed by POSISTOR.

15. Digital termination equipment according to claim 8, wherein said current path forming means is formed by a varistor.

16. Digital termination equipment according to claim 8, wherein analog signals of a 4-level pulse amplitude, which are defined as 2B1Q signals are transmitted over the 2-wire subscriber line.

17. Digital termination equipment for use in signal transmission over a 2-wire subscriber line through an interface transformer, wherein said interface transformer includes first and second windings respectively having first and second terminals, said equipment further comprising:
   a capacitor connected between the both first terminals of said first and second windings;
   a first impedance means functionally provided between the second terminal of the first winding of the interface transformer and a first terminal of the 2-wire subscriber line for generating a high impedance which is large enough to block off the transmission of signals to said first terminal of the subscriber line when a current more than a predetermined value flows in said first impedance means;
   a second impedance means functionally provided between the second terminal of the second winding of the interface transformer and a second terminal of the 2-wire subscriber line for generating a high impedance which is large enough to block off the transmission of signals to said second terminal of the subscriber line when a current more than a predetermined value flows in said second impedance means;
   a power supply means having first and second terminals connected between the both first terminals of the first and second windings and connected in parallel with said capacitor to supply voltage to said first and second impedance means during a local loopback testing; and
   a current path forming means connected between said first and second impedance means for forming a current path between the first and second impedance means.

18. Digital termination equipment according to claim 17,
   wherein said power supply means includes a dc power source and a switch means connected in series to the dc power source, said switch means being turned on when a local loopback testing is executed.

19. Digital termination equipment according to claim 18,
   wherein said switch means comprises a photo coupler.

20. Digital termination equipment according to claim 17,
   wherein said dc power source has a voltage more than the predetermined voltage value.

21. Digital termination equipment according to claim 17,
   wherein said first and second impedance means are formed by POSISTOR.

22. Digital termination equipment according to claim 21,
   wherein said current path forming means is formed by the surge absorber.

23. Digital termination equipment according to claim 21,
   wherein said current path forming means is formed by the dc termination circuit.

24. Digital termination equipment according to claim 17,
   wherein said current path forming means is formed by a varistor.

25. Digital termination equipment according to claim 17, further comprising:
   a surge absorber connected between the both terminals of the 2-wire signal transmission line, which indicates a low impedance when a surge voltage is applied thereto; and
   a dc termination circuit connected between the both terminals of the 2-wire signal transmission line, which plays as an electronic inductor for a dc termination with high impedance.

26. Digital termination equipment according to claim 17,
   wherein digital signals of a 4-level pulse amplitude, which are defined as 2B1Q signals are transmitted over the 2-wire subscriber line.

* * * * *